: (12) United States Patent
Murai et al.

(10) Patent No.: US 7,881,369 B2
(45) Date of Patent: Feb. 1, 2011

(54) IMAGE TRANSMISSION APPARATUS, IMAGE TRANSMISSION METHOD AND IMAGE TRANSMISSION PROGRAM

(75) Inventors: Shinya Murai, Kanagawa-ken (JP); Hajime Yamaguchi, Kanagawa-ken (JP); Toshio Shirakihara, Kanagawa-ken (JP); Haruhiko Toyama, Kanagawa-ken (JP); Takuya Kawamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1365 days.

(21) Appl. No.: 11/367,341

(22) Filed: Mar. 6, 2006

(65) Prior Publication Data

US 2006/0210177 A1 Sep. 21, 2006

(30) Foreign Application Priority Data

Mar. 4, 2005 (JP) ............................. 2005-060568

(51) Int. Cl.
*H04B 1/66* (2006.01)
*H04N 7/12* (2006.01)
*H04N 11/02* (2006.01)
*H04N 11/04* (2006.01)

(52) U.S. Cl. .................. 375/240.01; 375/240; 358/1.15; 358/1.1; 382/305; 382/307; 382/276; 382/173

(58) Field of Classification Search ............ 375/240.01, 375/240; 358/1.15, 1.1; 382/305, 307, 276, 382/173
See application file for complete search history.

(56) References Cited

U.S. PATENT DOCUMENTS 6,298,173 B1 * 10/2001 Lopresti ..................... 382/305
2004/0095601 A1 * 5/2004 Ozawa ....................... 358/1.15

FOREIGN PATENT DOCUMENTS

| JP | 11-136488 | 5/1999 |
| JP | 2000-50261 | 2/2000 |
| JP | 2004-86550 | 3/2004 |
| JP | 2004-242152 | 8/2004 |

OTHER PUBLICATIONS

U.S. Appl. No. 11/389,136 filed Mar. 27, 2006, Murai et al.

* cited by examiner

*Primary Examiner*—Phuong Phu
(74) *Attorney, Agent, or Firm*—Oblon, Spivak, McClelland, Maier & Neustadt, L.L.P.

(57) ABSTRACT

In an image transmission apparatus an image data generator generates image data that represents an image. An updated image data generator generates updated image data that represents an updated image of an updated region of the image. A compressor compresses the updated image data. A transmitter stores the updated image data that is compressed by the compressor. An updated image data storage stores the updated image data. A transmission result storage stores transmission result data that includes quality information and time information, the quality information relating to an image quality, the time information indicating when the updated image data is generated. A transmission data selector selects the updated image data stored in the updated image data storage, and sets the image quality of the updated image data selected, according to the transmission result data stored in the transmission result storage.

20 Claims, 12 Drawing Sheets

IMAGE TRANSMISSION APPARATUS, IMAGE TRANSMISSION METHOD AND IMAGE TRANSMISSION PROGRAM

CROSS REFERENCE TO RELATED APPLICATIONS

This application is based upon and claims the benefit of priority under 35 U.S.C. §119 from prior Japanese Patent Application P2005-60568 filed on Mar. 4, 2005, the entire contents of which are hereby incorporated by reference herein.

BACKGROUND OF THE INVENTION

1. Field of the Invention

The present invention relates to an image transmission apparatus that transmits image data with variable quality.

2. Discussion of the Background Art

A speed of a communication through a network has been improved on recently. The speed enables to control and to display an image sent from a remote computer over a network in real-time. In such a real-time network computing, full screen images or partial images of a full screen image are compressed and transmitted to a remote device.

For example, a network projector system is available. In such a system, a projector displays an image in real-time sent from a remote personal computer through a wireless LAN, based on standards such as IEEE802.11b and IEEE802.11g.

Additionally, VNC (Virtual Network Computing) is an application to enable such a real-time network computing. The VNC employs a kind of a lossless compression method. Therefore, all images are transmitted without distortion. But, a compression ratio cannot be changed in the compression method. Thereby, a size of the compressed image data sometimes becomes wider than a usable transmission bandwidth. Then, a refresh rate of the image data must be lower than usual.

Japanese patent publication (Kokai) No. 2004-86550 discloses an example of a solution to such a problem. As disclosed in this publication, an image is divided into a plurality of blocks. A block that has changed many times is given a lower priority to send to a display terminal.

However, in this technique, a block that changes frequently still needs a wide transmission bandwidth to maintain smoothness of the image.

Movie compression methods such as MPEG (Moving Picture Experts Group) standards are another example of a solution of the above problem. According to MPEG standards, a difference of an image from a previous appearance of the image is compressed and sent. The previous appearance of the image is extended from a previous compressed data.

In the compression, a bigger quantization unit is used to reduce the compressed data when the amount of the compressed difference data is larger than a usable transmission bandwidth, and a smaller quantization unit is used when the amount of the compressed difference data is smaller than a usable transmission bandwidth.

This method keeps a high refresh rate of the image data, and enables to send a higher resolution image when the difference is little. But an extension processing to obtain the previous appearance of the image is required. The extension process is very taxing.

SUMMARY OF THE INVENTION

According to an exemplary embodiment, the present invention provides a novel image transmission apparatus including: an image data generator configured to generate image data that represents an image; an updated image data generator configured to generate updated image data that represents an updated image of an updated region of the image; a compressor configured to compress the updated image data; a transmitter configured to transmit the updated image data compressed by the compressor; an updated image data storage configured to store the updated image data; a transmission result storage configured to store transmission result data that includes quality information and time information, the quality information relating to an image quality, the time information indicating when the updated image data is generated; and a transmission data selector configured to select the updated image data stored in the updated image data storage, and to set the image quality of the updated image data selected, according to the transmission result data stored in the transmission result storage.

Another non-limiting aspect of the present invention provides a novel image transmission apparatus including: image data generating means for generating image data that represents an image; updated image data generating means for generating updated image data that represents an updated image of an updated region of the image; compressing means for compressing the updated image data; transmitting means for transmitting the updated image data compressed by the compressing means; updated image data storing means for storing the updated image data; result storing means for storing transmission result data that includes quality information and time information, the quality information relating to an image quality, the time information indicating when the updated image data is generated; and transmission data selecting means for selecting the updated image data stored in the updated image data storing means, and to set the image quality of the updated image data selected, according to the transmission result data stored in the transmission result storing means.

Yet another non-limiting aspect of the present invention includes a novel image transmission method including: generating image data that represents an image; generating updated image data that represents an updated image of an updated region of the image; compressing the updated image data; transmitting the compressed updated image data; storing the updated image data; storing transmission result data that includes quality information and time information, the quality information relating to an image quality, the time information indicating when the updated image data is generated; and selecting the updated image data according to the transmission result data, and setting the image quality of the updated image data which is selected, according to the transmission result data.

Another aspect of the present invention includes a novel image transmission program to be executed by computer, including: generating image data that represents an image; generating updated image data that represents an updated image of an updated region of the image; compressing the updated image data; transmitting the compressed updated image data; storing the updated image data; storing transmission result data that includes quality information and time information, the quality information relating to an image quality, the time information indicating when the updated image data is generated; and selecting the updated image data according to the transmission result data, and setting the image quality of the updated image data which is selected, according to the transmission result data.

BRIEF DESCRIPTION OF THE DRAWINGS

The invention is best understood from the following description of the non-limiting embodiments when read in connection with the accompanying drawings, wherein.

DETAILED DESCRIPTION OF THE PREFERRED EMBODIMENTS

Figure 1:
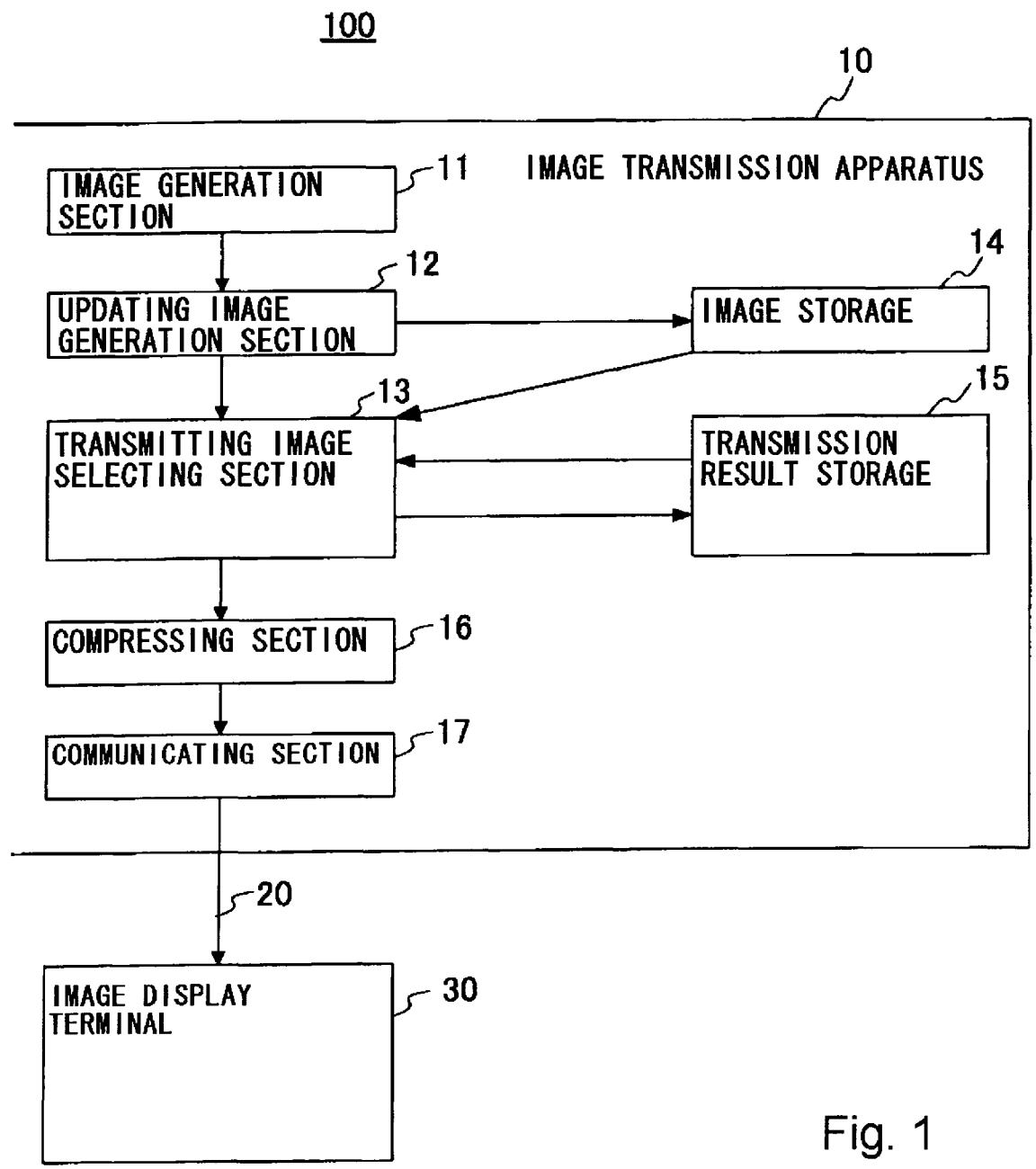
FIG. 1 is a diagram illustrating an image transmission system according to a first embodiment of the present invention.

Referring now to the FIGS. in which like reference numerals designate identical or corresponding parts throughout the several views, FIG. 1 illustrates a diagram of an example of a first non-limiting embodiment of an image transmission system 100 of the present invention.

An image transmission system 100 includes an image transmission apparatus 10 and an image display terminal 30. The image display terminal 30 connects to a network 20. The image transmission apparatus 10 generates image data representing an image that should be displayed on a screen of the image display terminal 30. The image transmission apparatus 10 transmits the image data to the image display terminal 30 through the network 20.

The image transmission apparatus 10 may be a type of apparatus to generate an image for displaying on a screen, such as a PC (Personal Computer), a PDA (Personal Digital (Data) Assistants), a cellular phone, a game machine, etc.

The image display terminal 30 receives the image data transmitted from the image transmission apparatus 10 through the network 20, and displays the image represented by the image data. The image display terminal 30 includes a type of device to display the image, such as a CRT (Cathode Ray Tube), LCD (Liquid Crystal Display), etc. The image display terminal 30 may be a television, a PC, a PDA, a projector, etc. The image display terminal 30 may display the image as a full screen size or at a smaller size than the full screen size. The image may be in a window frame.

The image transmission apparatus 10 may send position information. The position information includes a coordinate and a range on the screen of the image display terminal 30. The image display terminal 30 may display the image according to the position information.

The image transmission apparatus 10 includes an image generation section 11, an updating image generation section 12, a transmitting image selecting section 13, an image storage 14, a transmission result storage 15, a compressing section 16, and a communicating section 17.

The image generation section 11 generates image data to be displayed on the screen of the image display terminal 30. The image generation section 11 may be controlled with an operating system (OS). The image generation section 11 generates a drawing instruction according to an application program, and processes the image data according to the drawing instruction and the OS. The image generation section 11 writes the image data into a frame buffer in the image storage 14.

The updating image generation section 12 outputs updated image data representing an image of an updated region on a full screen image. The updating image generation section 12 monitors the writing data of the image generation section 11 into the frame buffer in the image storage 14, and outputs the writing data.

The updated image data may be generated by other techniques. As an example of such a technique, the updating image generation section 12 obtains information representing which region the image generation section 11 updates, and reads out the data of the region on the frame buffer. Another example of such a technique, the updating image generation section 12 monitors a drawing instruction generated by the image generation section 11 according to an application program, and generates the updated image data according to the drawing instruction.

The updated image data includes position information. The position information may be, for example, a block index number on the full screen image, a coordinate on the full screen image, etc.

The timing to snap the updated image of the updating image generation section 12 may be the timing of writing of the image generation section 11 into the frame buffer.

Moreover, the timing may be configured to a timing of obtaining information representing which region the image generation section 11 updates, a timing of reading out the data of the region on the frame buffer, a timing of obtaining the drawing instruction generated by the image generation section 11, a timing of generating the updated image data according to the drawing instruction, every predetermined interval, a timing required for the updated image data by the transmitting image selecting section 13, etc.

The updating image generation section 12 may be configured to hold a plurality of updated image data and output them sequentially.

The image storage 14 stores the image data generated by the image generation section 11. The image storage 14 may include a frame buffer. The image storage 14 stores the latest image data, which represents a full screen size image, generated by the image generation section 11. The updated image data is written on a region, represented by the position information, on the frame buffer. A contemporary image data is acquired by reading out the data from the frame buffer.

Other than this technique, contemporary image data may be acquired by a service of the OS if the OS supports that.

The transmitting image selecting section 13 selects transmission image data for every predetermined period according to the updated image data and transmission result data. The transmission result data is stored in the transmission result storage 15.

The transmission image data is selected from among the updated image data and the image data stored in the image storage 14.

If the image data stored in the image storage 14 is selected as the transmission image data, the transmitting image selecting section 13 determines which region of the image represented by the image data should be sent, and also determines a quality of the transmission image data.

The transmission result storage 15 stores the transmission result data which includes quality information and time information. The transmission result data is stored for every unit of the transmission image data such as a pixel, a block of pixels, etc. The quality information indicates a quality of the transmission image data. The quality information may be a timing of the quantization of a DCT coefficient in a JPEG compression. The quality information may be a type of compression. The time information indicates the time to transmit the transmission image data. The time information may be an actual time, a difference from a reference time, etc. The difference from a reference time may be an elapsed time from the start-up of the image transmission apparatus 10.

The compressing section 16 compresses the transmission image data according to a compression method selected by the transmitting image selecting section 13.

The communicating section 17 transmits the transmission image data compressed by the compressing section 16 to the image display terminal 30 through the network 20.

The image transmission apparatus 10 may be a computer, such as a PC, with a program to realize the function using components of the computer.

Figure 2:
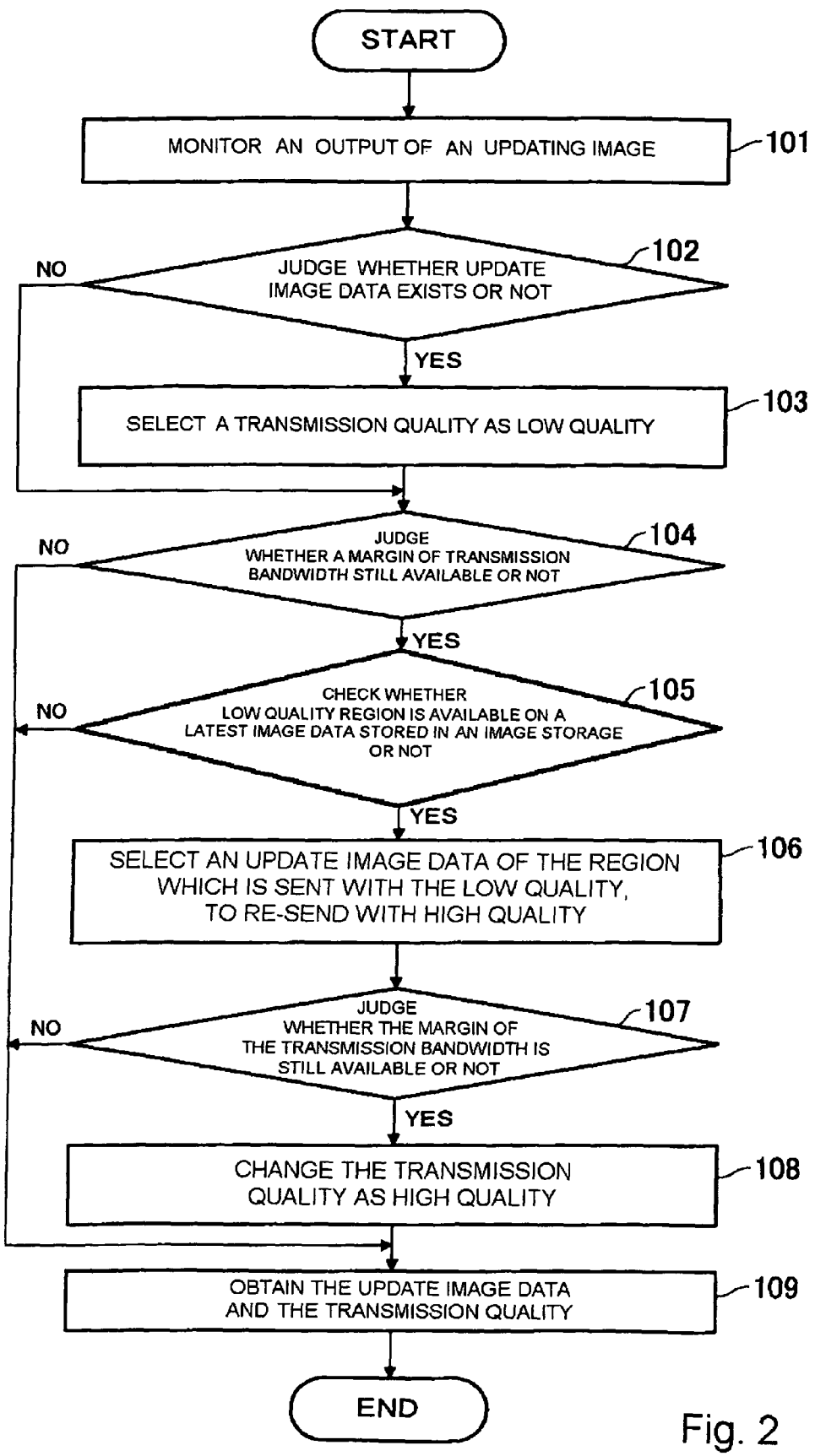
FIG. 2 is a flowchart illustrating a selection process of a transmission image data according to the first embodiment.

FIG. 2 illustrating a selection process of transmission image data in the transmitting image selecting section 13. This operation is repeated a predetermined period cycle.

The transmitting image selecting section 13 monitors the output of the updating image generation section 12 (Step 101).

The transmitting image selecting section 13 judges whether updated image data exists or not (Step 102). If the updated image data exists (Yes in Step 102), the transmitting image selecting section 13 selects a transmission quality as low quality (Step 103). If the updated image data does not exist (No in Step 103), the transmitting image selecting section 13 judges whether a margin of transmission bandwidth is still available or not (Step 104), i.e. does enough bandwidth exist to send the low quality updated image data.

If there is no margin (No in Step 104), the updated image data and the transmission quality are sent to the compressing section 16 (Step 109). Then, the transmitting image selecting section 13 sends information, such as the position information of the updated image data, coordinate of the updated image data, quality of the updated image data, and transmitting time, to the transmission result storage 15. According to the information, the transmission result storage 15 updates the transmission result data.

At the Step 104, if the margin of the transmission bandwidth is still available (Yes in Step 104), i.e. if enough bandwidth exists to send the low quality updated image data, the transmitting image selecting section 13 checks whether low quality data, which is transmitted with low quality, is available in the latest image data on the image storage 14 or not according to the transmission result data stored in the transmission result storage 15 (Step 105).

If the margin of the transmission bandwidth is not available (No in Step 104), the transmitting image selecting section 13 gives the updated image data and the result of the transmission quality judged and selected at the Step 103 to the compressing section 16 (Step 109). Then, the transmitting image selecting section 13 gives the updated image data and the result of the transmission quality judged and selected at the Step 103 to the transmission result storage 15. The updated image data and the result of the transmission quality transmitted from the transmitting image selecting section 13 are stored in the transmission result storage 15.

If the transmitting image selecting section 13 detects the low quality data in the latest image data according to the transmission result data stored in the transmission result storage 15 (Yes in Step 105), the transmitting image selecting section 13 selects an updated image data of the region which is sent with the low quality, to re-send with high quality (Step 106). The retransmission data is attached to the updated image data for which the transmission quality is selected at Step 103.

Then, the transmitting image selecting section 13 judges whether the margin of the transmission bandwidth is still available or not (Step 107), i.e. does enough bandwidth exist to transmit the updated data with the high quality. If there is no margin (No in Step 107), the compressing section 16 obtains the updated image data for which the transmission quality is selected at the Step 103 and its transmission quality (Step 109). Then, the transmitting image selecting section 13 gives the transmission result data of the updated image data referred by the compressing section 16 at the Step 109 to the transmission result storage 15. The transmission result storage 15 updates the stored transmission result data in its own.

If there is the margin of the transmission bandwidth still available at Step 107 (Yes in Step 107), the transmission quality selected at the step 103 is changed to high quality (Step 108). Then, the compressing section 16 obtains the updated image data for which the transmission quality is selected at the Step 103 and its transmission quality, and the updated image data that the transmission quality is selected at the Step 106 and its transmission quality (Step 109). The updated image data and the transmission quality are sent to the compressing section 16. Then, the transmitting image selecting section 13 sends information, such as the position information of the updated image data, coordinate of the updated image data, quality of the updated image data, transmitting time, to the transmission result storage 15. According to the information, the transmission result storage 15 updates the transmission result data.

In addition, at Step 109, the updated image data is acquired from the updating image generation section 12, and the updated image data for retransmission is acquired from the image storage 14.

Examples of operations of the image transmission system 100 are described below.

Hereinafter, an example of the selection process of the transmitting image selecting section 13 is explained.

FIGS. 3 to 6 are diagrams illustrating examples of full screen images represented by the image data that the image transmission apparatus 10 transmits at times t1-t4 respectively.

In these figures, each of full screen images are divided into a block of 7×7 every direction respectively. The updating image generation section 12 generates updated image data in the unit of the block. The transmitting image selecting section 13 selects the transmission image data periodically. The transmitting image selecting section 13 can choose the quality of the transmission image data from low quality and high quality. A compression ratio of the "low quality" is twice a compression ratio of the "high quality". The maximum bandwidth for the transmission of the updated image data is the bandwidth to transmit sixteen low quality blocks in a cycle. Therefore, eight high quality blocks can be transmitted with the maximum bandwidth in a cycle.

At the time t1, the transmitting image selecting section 13 performs the selection processing of transmission image data as follows.

Figure 3:
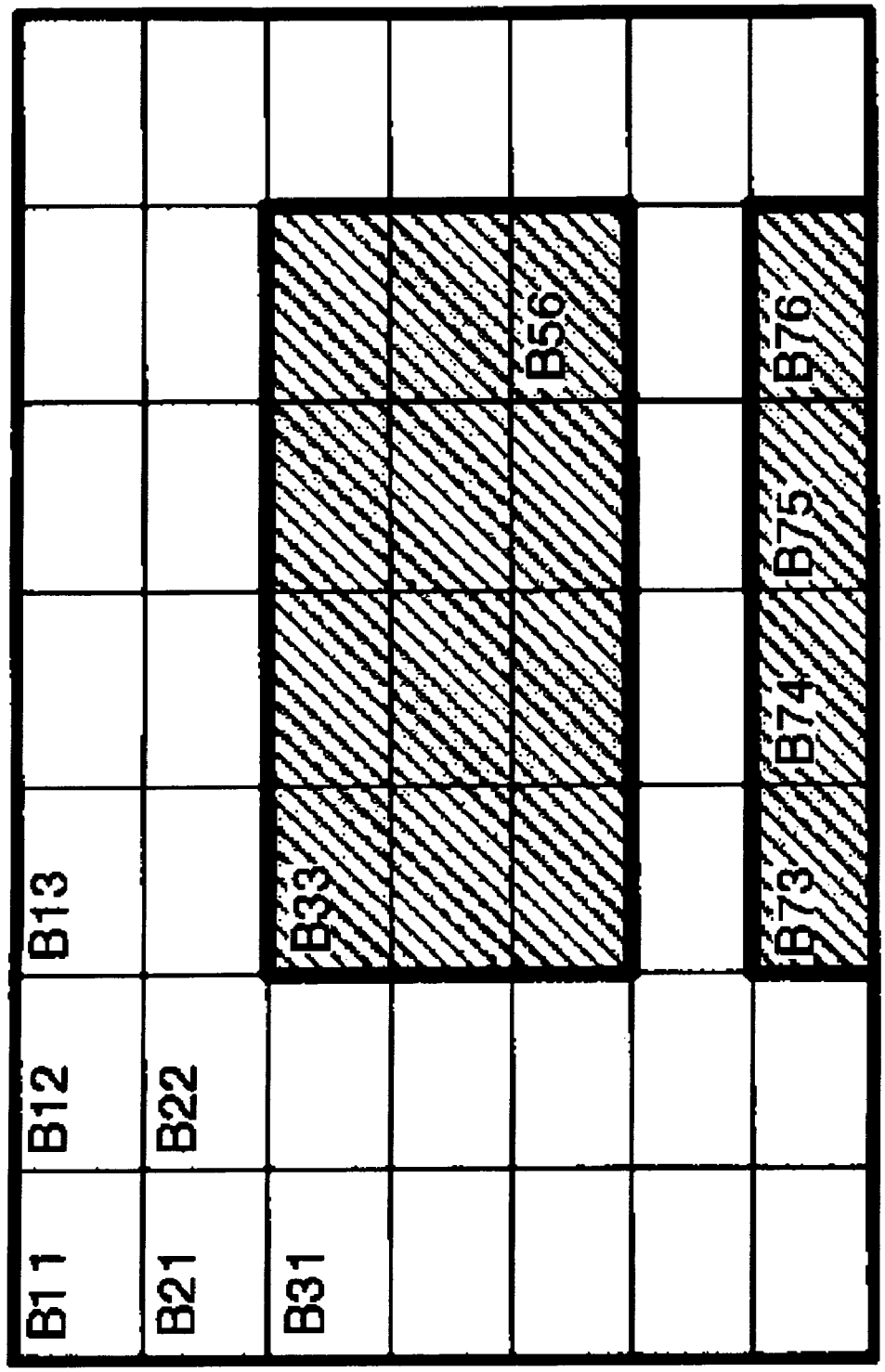
FIG. 3 is an example of a transmission image data at a time t1 selected in a selection process according to the first embodiment.

As shown in FIG. 3, the transmitting image selecting section 13 obtains twelve blocks of updated image data including blocks B33 and B56. The twelve blocks constitute a rectangle region. The transmitting image selecting section 13 obtains four blocks including blocks B73, B74, B75, and B76 also.

The transmitting image selecting section 13 obtains the transmission result data about the transmission image data, which is already transmitted, from the transmission result storage 15. In this example, each of transmission result data stored in the transmission result storage 15 indicates that the blocks were transmitted with high quality, respectively.

The transmitting image selecting section 13 selects qualities of each transmission image data of those sixteen blocks obtained from the updating image generation section 12 as low quality. The transmitting image selecting section 13 sends those sixteen blocks to the compressing section 16 with the qualities of transmission image data.

It is understood from the explanation above that the quality of the transmission image data is selected as low quality at first.

Then, the transmitting image selecting section 13 sends the block index number, the quality of the transmission image data, and the time information that represents the time t1 to the transmission result storage 15. The transmission result storage 15 updates the transmission result data stored in it based on the information sent from the transmitting image selecting section 13.

Figure 4:
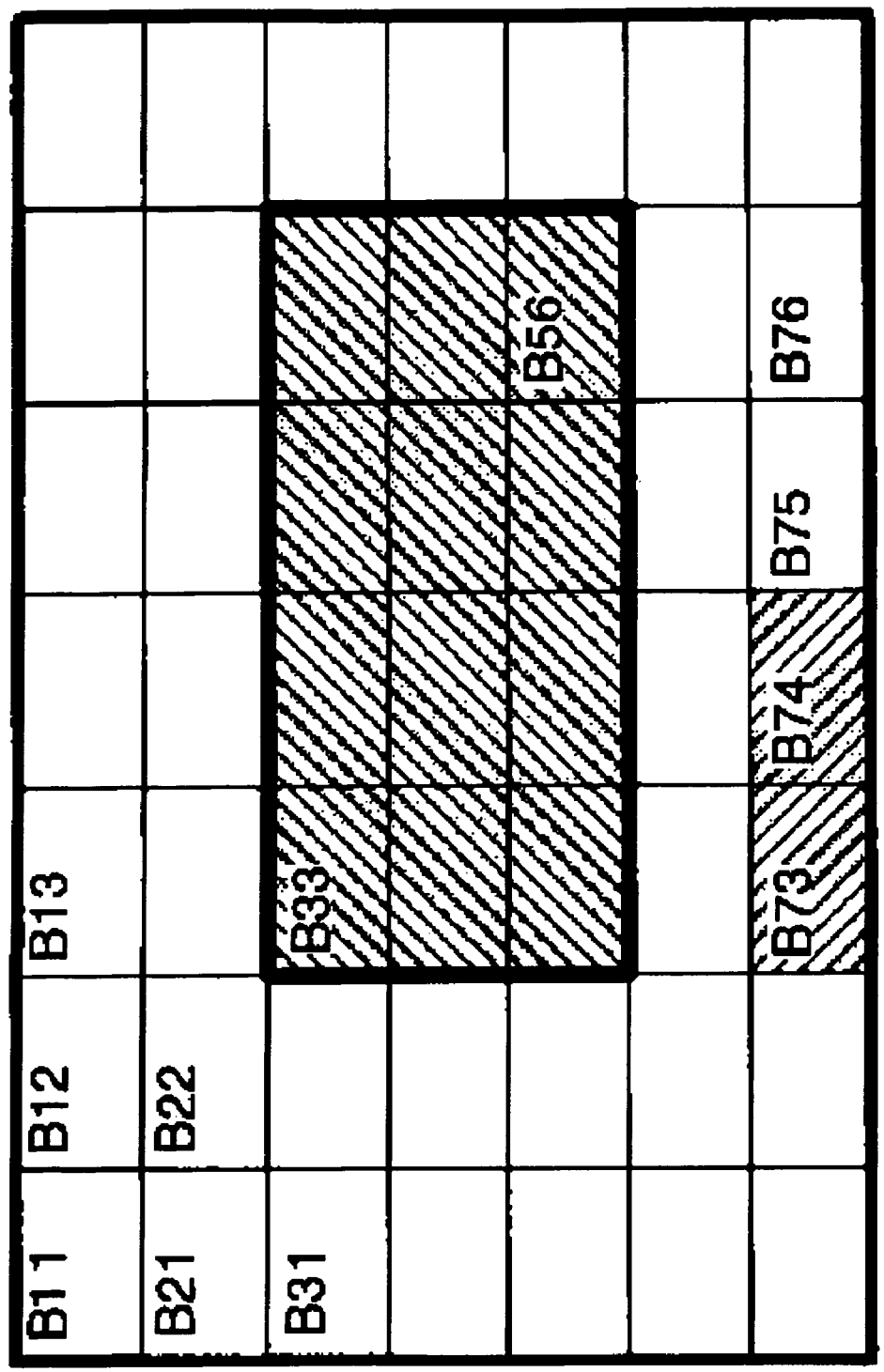
FIG. 4 is an example of a transmission image data at a time t2 selected in a selection process according to the first embodiment.

At the time t2, the transmitting image selecting section 13 obtains new updated image data of the rectangle region including blocks B33 and B56 as shown in FIG. 4 with a heavy line frame.

The transmitting image selecting section 13 obtains the transmission result data about the transmission image data, which is already transmitted, from the transmission result storage 15.

In this case, the transmitting image selecting section 13 selects qualities of each transmission image data of the twelve blocks such as the blocks B33 and B56 included in the rectangle region as low quality. The transmission bandwidth is used only for as much as those twelve blocks by the blocks. At this time, though, there is a margin of the transmission bandwidth for only at most four blocks (i.e. only four low quality block or two high quality blocks can be sent on the available bandwidth), and therefore, in this example the transmitting image selecting section 13 changes the qualities of the transmission image data of the blocks B73 and B74 from low quality to high quality.

There is a predetermined priority of blocks to change their quality. The change is prosecuted according to the priority.

Then, the transmitting image selecting section 13 sends the block index number, the quality of the transmission image data, and the time information that represents the time t2 to the transmission result storage 15, that indicate transmission of blocks B73, B74 with high quality. The transmission result storage 15 updates the transmission result data stored in it based on the information sent from the transmitting image selecting section 13.

At the time t3, the transmitting image selecting section 13 obtains no updated image data from the updating image generation section 12.

The transmitting image selecting section 13 obtains the transmission result data about the transmission image data, which was already transmitted, from the transmission result storage 15.

Figure 5:
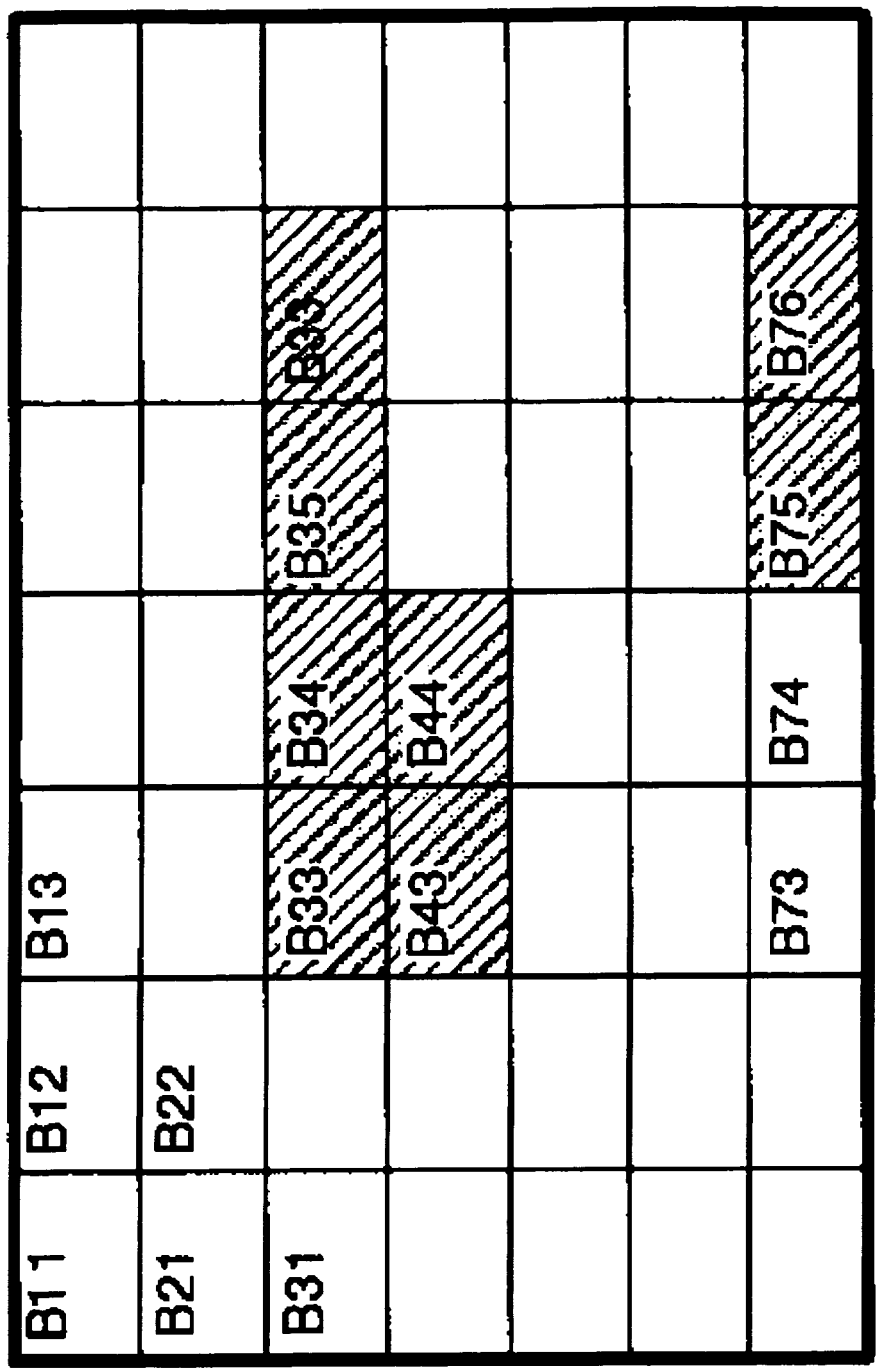
FIG. 5 is an example of a transmission image data at a time t3 selected in a selection process according to the first embodiment.

In FIG. 5, the blocks B33, B34, B35, B36, B43, B44, B75, and B76 are filled with a striped pattern.

The time information of the blocks B75 and B76 stored in the transmission result storage 15 are t1, which is older than the time information of the other updated blocks at time t2. So, the transmitting image selecting section 13 selects to re-send the updated image data of the blocks B75 and B76 with high quality.

Moreover, because the quality information of the blocks B33, B34, B35, B36, B43 and B44 stored in the transmission result storage 15 are low quality, the transmitting image selecting section 13 selects to re-send the updated image data of the blocks B33, B34, B35, B36, B43 and B44 with high quality.

Then, the transmitting image selecting section 13 sends the block index number, the quality of the transmission image data, and the time information that represents the time t3 to the transmission result storage 15, that indicate transmission of blocks B33, B34, B35, B36, B43, and B44 with high quality at time t3. The transmission result storage 15 updates the transmission result data stored in it based on the information sent from the transmitting image selecting section 13.

At the time t4, the transmitting image selecting section 13 obtains no updated image data from the updating image generation section 12 again.

The transmitting image selecting section 13 obtains the transmission result data about the transmission image data that is already transmitted, from the transmission result storage 15.

Figure 6:
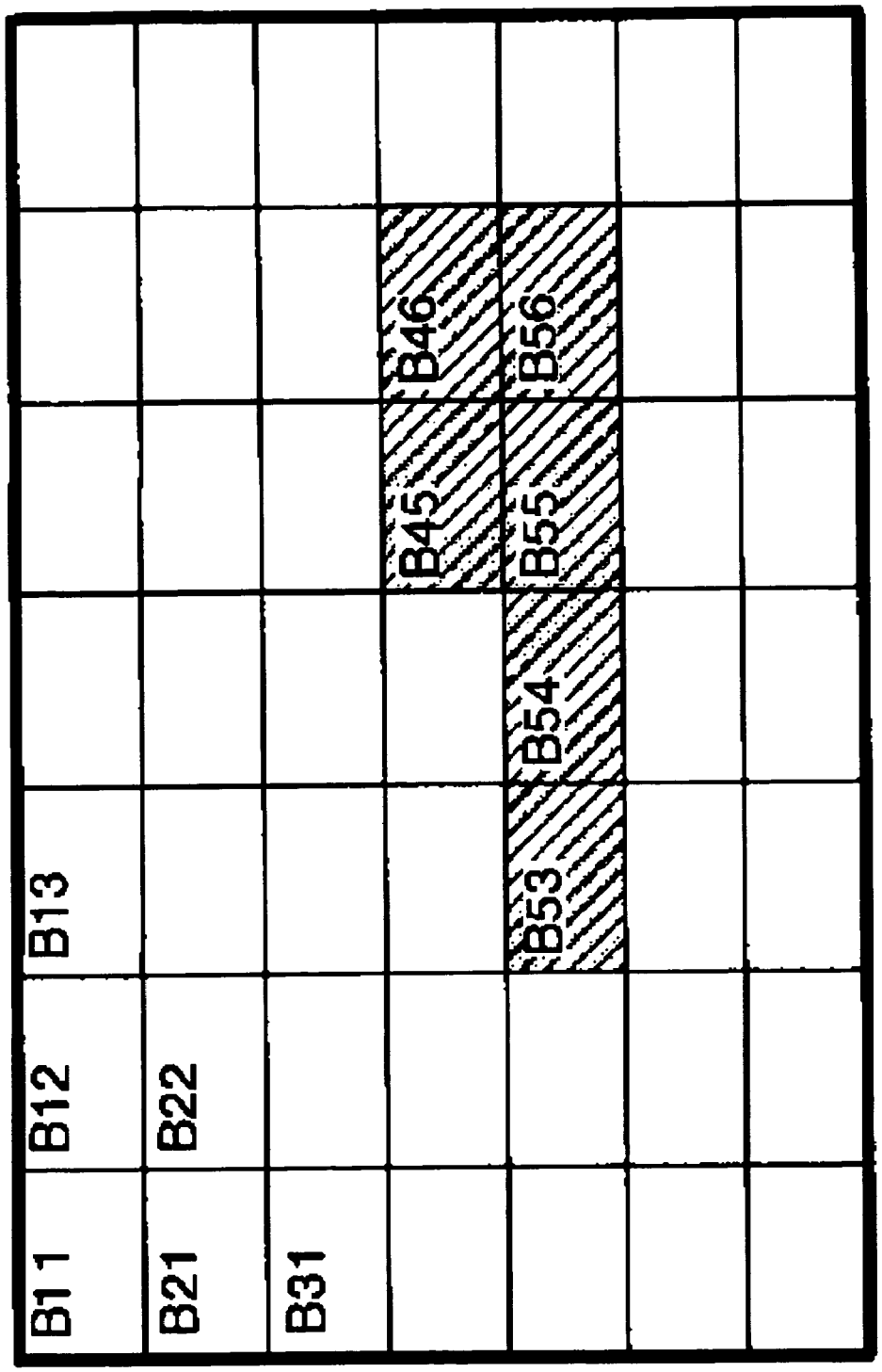
FIG. 6 is an example of a transmission image data at a time t4 selected in a selection process according to the first embodiment.

In FIG. 6, the blocks B45, B46, B53, B54, B55, and B56 are filled with a striped pattern.

Because the quality information of those blocks stored in the transmission result storage 15 are low quality, the transmitting image selecting section 13 selects to re-send the updated image data of the blocks B45, B46, B53, B54, B55, and B56 with high quality.

Then, the transmitting image selecting section 13 sends the block index number, the quality of the transmission image data, and the time information that represents the time t4 to the transmission result storage 15, that indicate transmission of blocks B45, B46, B53, B54, B55, and B56 with high quality at time t4. The transmission result storage 15 updates the transmission result data stored in it based on the information sent from the transmitting image selecting section 13.

As described above, data of the updated region of a full screen image can be sent with a predetermined transmission bandwidth timely by using a low transmission data quality. A receiver can be receive the data just like in real-time.

Moreover, the transmitted data is re-sent with high quality using a margin of the transmission bandwidth, and thereby the full screen image can be prevented from a serious degradation.

Furthermore, since a decode processing in image transmission apparatus 10 is unnecessary, the processing burden of image transmission apparatus 10 can be lightened.

Hereinafter, another example of the selection process of the transmitting image selecting section 13 is explained.

FIGS. 7 to 11 are diagrams illustrating examples of full screen images represented by the image data that the image transmission apparatus 10 transmits at the times t1-t5 respectively. Each rectangle region represents position information of the updated image data stored in the transmission result storage 15 respectively.

In these figures, the updating image generation section 12 generates updating image data in units of the rectangle regions, and the transmission result storage 15 stores transmission result data of them as a table including position information, quality information, and time information.

The transmitting image selecting section 13 selects transmission image data at both a timing of getting the updated image data from the updating image generation section and a timing of every predetermined interval T. The transmitting image selecting section 13 chooses an updated image data transmitted with low quality over a past predetermined time length indicated by the transmission result data stored in the transmission result storage 15 as the transmission image data.

The transmitting image selecting section 13 can choose the quality of the transmission image data from "low quality" and "high quality".

Figure 8:
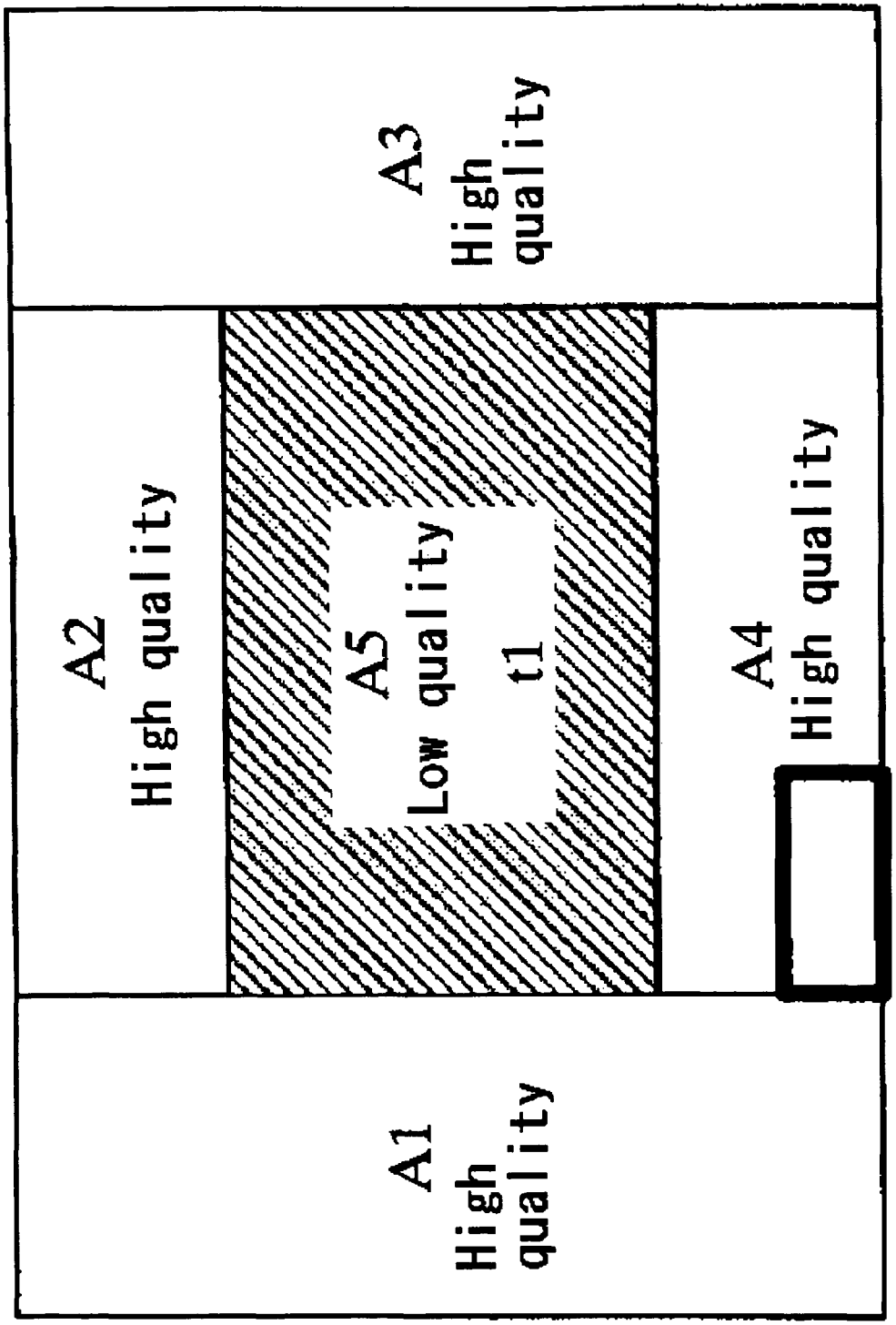
FIG. 8 is another example of a transmission image data at a time t2 selected in a selection process according to the first embodiment.

The maximum bandwidth for the transmission of the updated image data is the bandwidth to transmit the block A5 illustrated in FIG. 8 with high quality in a cycle.

Figure 7:
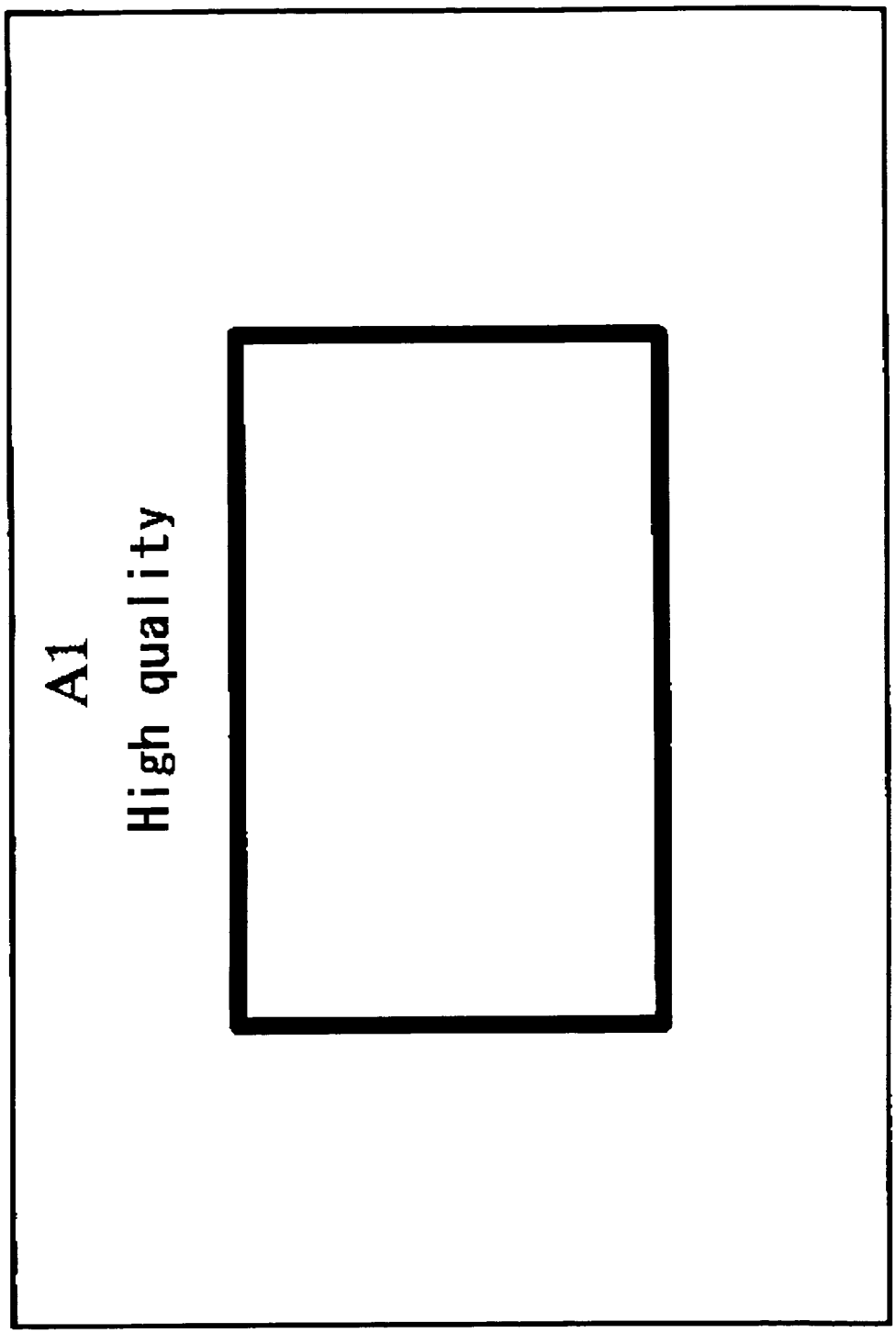
FIG. 7 is another example of a transmission image data at a time t1 selected in a selection process according to the first embodiment, and shows an example of the transmitting image data in time t1 by selection processing of another transmitting image data.

At the time t1, the transmitting image selecting section 13 obtains new updated image data from the updating image generation section 12. FIG. 7 illustrates an image of the transmission result data stored in the transmission result storage 15 at time t1.

The rectangle region illustrated with a heavy line frame is represented by updated image data at the time t1. The transmitting image selecting section 13 obtains the transmission result data about the transmission image data, which was already transmitted, from the transmission result storage 15. The transmission result data stored in the transmission result storage 15 indicates that the full screen image data was transmitted with high quality.

The transmitting image selecting section 13 selects a quality of transmission of the updated image data as low quality. The transmitting image selecting section 13 sends the updated image data to the compressing section 16 with the quality information of the transmission.

Then, the transmitting image selecting section 13 sends the position information of the region, the quality of the transmission image data, and the time information that represents the time t1 to the transmission result storage 15, that indicates transmitting the indicated updated data with high quality at time t1. The transmission result storage 15 updates the transmission result data stored in it based on the information sent from the transmitting image selecting section 13.

At the time t2, the transmitting image selecting section 13 obtains new updated image data from the updating image generation section 12.

FIG. 8 illustrates an image of the transmission result data at time t2. The rectangle region illustrated with a heavy line frame is represented by updated image data at the time t2. This rectangle region corresponds to a rectangle region A7 in FIG. 9.

The transmitting image selecting section 13 obtains the transmission result data about the transmission image data that was already transmitted, from the transmission result storage 15.

In this case, the transmitting image selecting section 13 selects quality of transmission of the updated image data that represents the rectangle region illustrated with a heavy line frame in FIG. 8 as low quality.

The updated image data of rectangle region A5 was transmitted with low quality at the time t1, but the margin of the transmission bandwidth is not enough to re-send the updated image data of the region A5. Therefore, the updated image data of the region A5 is not re-sent at this time. So, the transmitting image selecting section 13 selects to send only the new updated image data that represents the rectangle region illustrated with a heavy line frame in FIG. 8, at the time t2.

Then, the transmitting image selecting section 13 sends the position information of the region A5, the quality of the transmission image data, and the time information that indicates the time t2 to the transmission result storage 15, that indicates transmitting region A7 with low quality at time t2. The transmission result storage 15 updates the stored transmission result data in its own.

Figure 9:
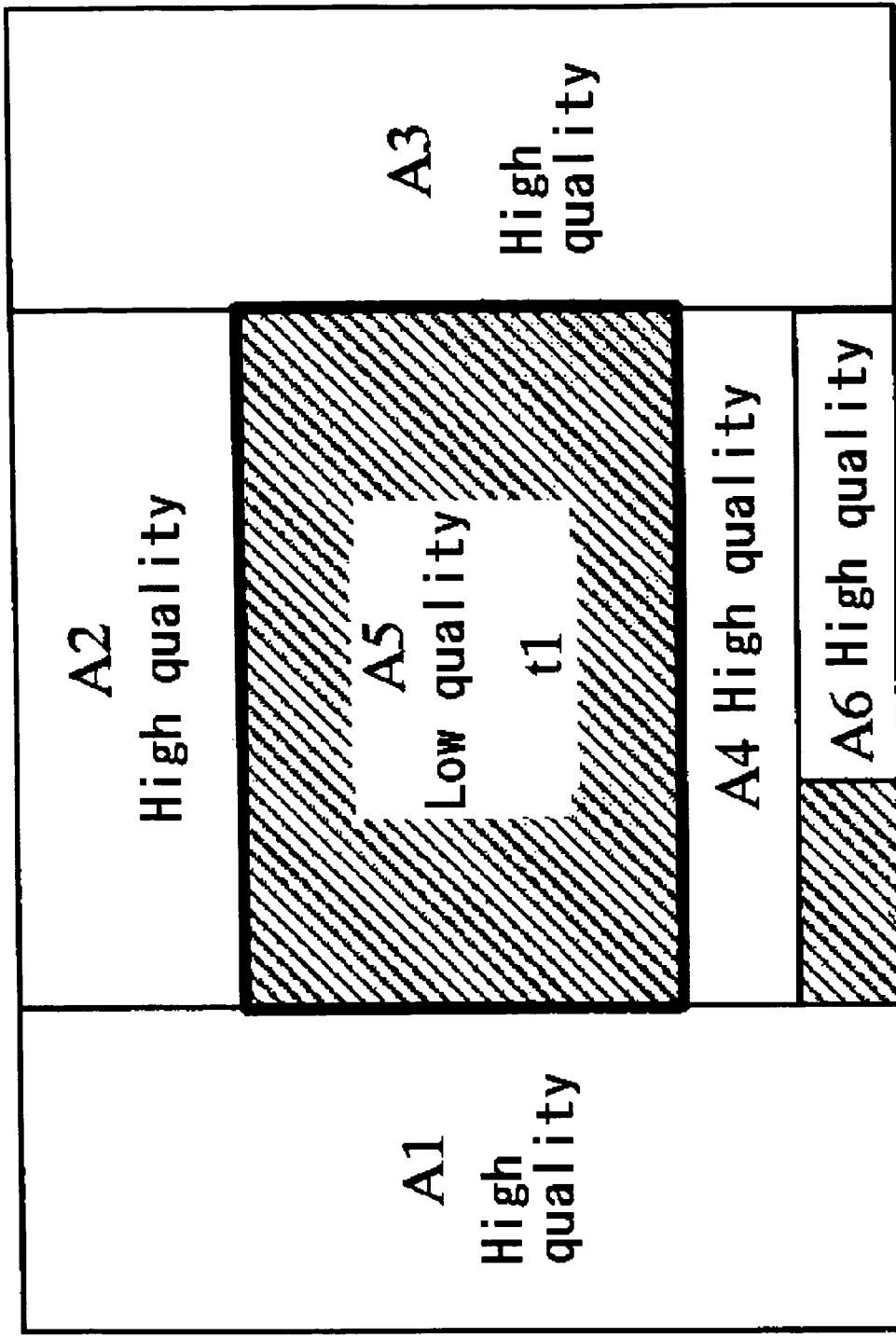
FIG. 9 is another example of a transmission image data at a time t3 selected in a selection process according to the first embodiment.

At the time t3, the transmitting image selecting section 13 obtains new updated image data from the updating image generation section 12. FIG. 9 illustrates an image of the transmission result data at time t3. The rectangle region A5 illustrated with a heavy line frame is represented by updated image data at the time t3.

The transmitting image selecting section 13 obtains the transmission result data about the transmission image data that was already transmitted, from the transmission result storage 15.

Although the transmitting image selecting section 13 determines that the rectangle regions A5 and A7 were transmitted with low quality, the transmitting image selecting section 13 selects to send a new updated image data of the region A5 instead of re-sending the old updated image data of the regions A5 and A7.

In this case, there is not enough margin on the transmission bandwidth because the new updated image data of the region A5 uses all the transmission bandwidth, i.e. the available bandwidth is only enough to send region A5 with low quality. Therefore, the updated image data of the region A7 is not re-sent at this time.

Then, the transmitting image selecting section 13 sends the position information of the region A5, the quality of the transmission image data, and the time information that indicates the time t3 to the transmission result storage 15, that indicate transmitting region A5 with low quality at time t3. The transmission result storage 15 updates the stored transmission result data in its own.

At the time t3, the transmitting image selecting section 13 obtains new updated image data from the updating image generation section 12.

Figure 10:
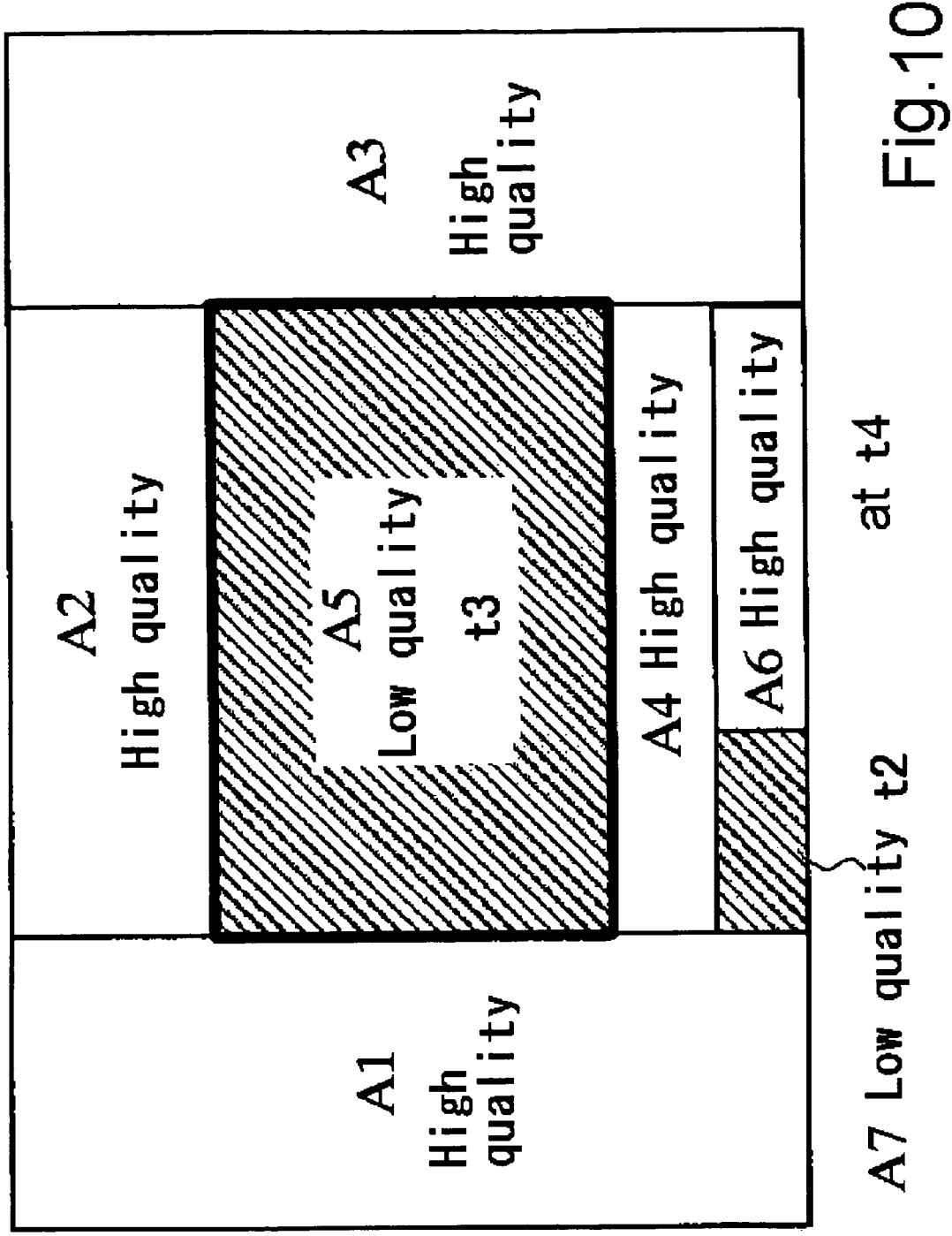
FIG. 10 is another example of a transmission image data at a time t4 selected in a selection process according to the first embodiment.

FIG. 10 illustrates an image of the transmission result data at time t4. The rectangle region A5 illustrated with a heavy line frame is represented by updated image data at the time t4.

The transmitting image selecting section 13 obtains the transmission result data about the transmission image data that was already transmitted, from the transmission result storage 15.

The transmitting image selecting section 13 determines that the updated image data of the region A5 was sent at the time t3 and the updated image data of the region A7 was sent at the time t2 in the past. According to that information, the transmitting image selecting section 13 selects to send the new updated image data of the region A7 with high quality.

The predetermined time length is shorter than a difference between t4 and t2, and is longer than a difference between t4 and t3. So, the updated image data of the region A7 is updated image data transmitted with low quality over a predetermined past time length indicated by the transmission result data stored in the transmission result storage 15.

Moreover, the transmitting image selecting section 13 selects not to re-send the updated image data of the region A5 at the time t4 because there is not enough bandwidth margin to send the updated image data of the region A5 with high quality. So, the transmitting image selecting section 13 selects to send only the new updated image data of the region A7 at the time t4.

Then, the transmitting image selecting section 13 sends the position information of the region A7, the quality of the transmission image data, and the time information that indicates the time t4 to the transmission result storage 15, that indicates transmitting data of region A7 with high quality at time t4. The transmission result storage 15 updates the stored transmission result data in its own.

Figure 11:
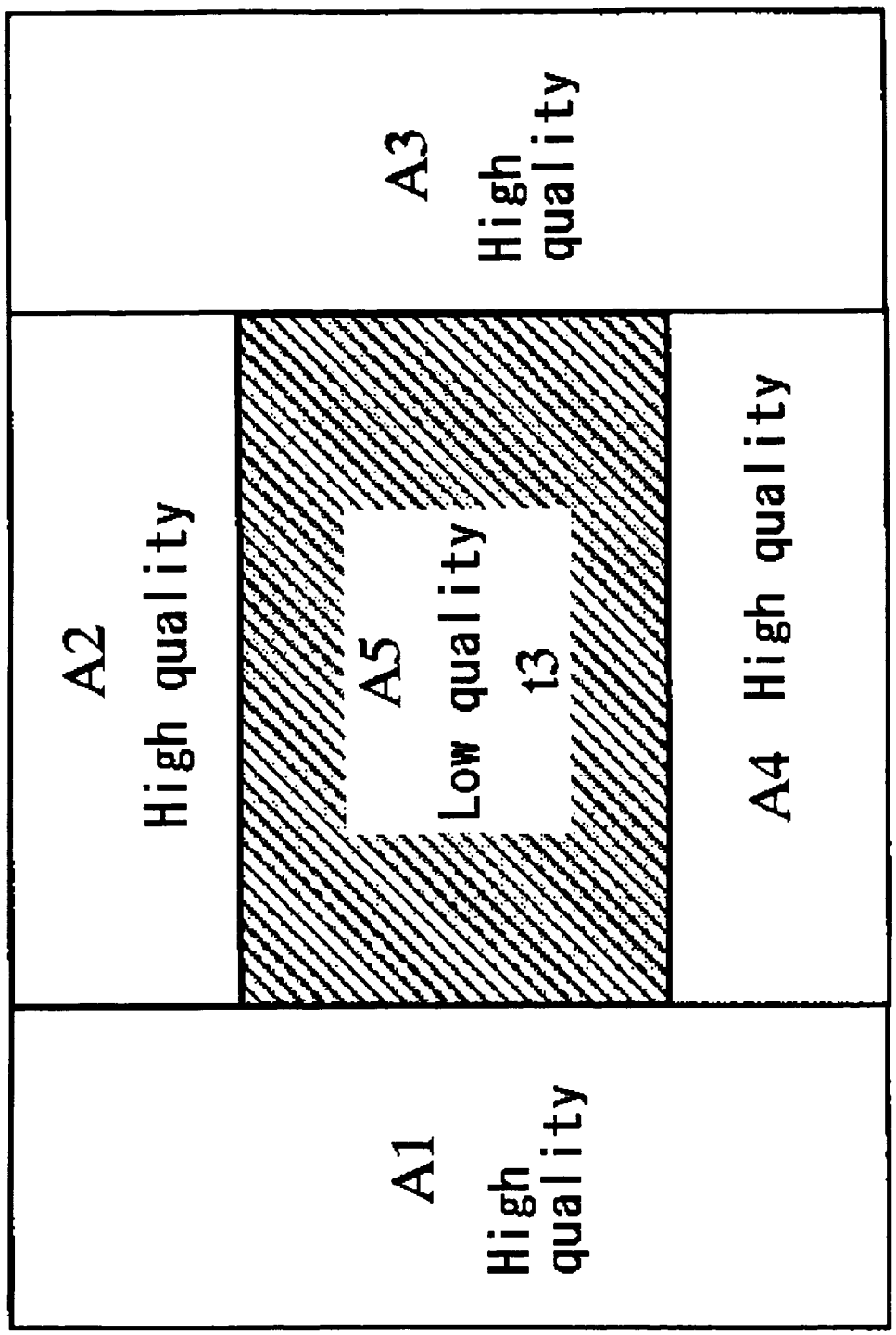
FIG. 11 is another example of a transmission image data at a time t5 selected in a selection process according to the first embodiment.

At the time t5, the timing of the elapse of the predetermined interval T has come. FIG. 11 illustrates an image of the transmission result data stored in the transmission result storage 15 at time t5. Note there is no heavy line frame on the figure which represents new updated image data because this timing is not a timing to obtain updated image data from the updating image generation section.

The transmitting image selecting section 13 obtains the transmission result data about the transmission image data, which was already transmitted, from the transmission result storage 15.

The transmitting image selecting section 13 determines that the updated image data of the region A5 was sent at the time t3 with low quality in the past. According to that information, the transmitting image selecting section 13 selects to send the updated image data of the region A5 with high quality.

Then, the transmitting image selecting section 13 sends the position information of the region A5, the quality of the transmission image data, and the time information that indicates the time t5 to the transmission result storage 15, that indicates transmitting data of region A5 with high quality at time t5. The transmission result storage 15 then updates the stored transmission result data in its own.

As described above, data of the updated region of a full screen image can be sent with a predetermined transmission bandwidth timely by using a low transmission data quality. A receiver can receive the data just like in real-time. Moreover, the transmitted data is re-sent with high quality using a margin of the transmission bandwidth, and thereby the full screen image can be prevented from a serious degradation.

Furthermore, since a decode processing in image transmission apparatus 10 is unnecessary, a processing burden on image transmission apparatus 10 can be lightened.

Moreover, by choosing updated image data transmitted with low quality over a predetermined past time length as the transmission image data, a low quality region does not remain on the full screen image for a long time. Thereby, the full screen image can be prevented from a serious degradation.

Although the predetermined time length is used as a threshold of the updating in the example above, it may be employed to use a predetermined part of the transmission bandwidth for high quality updated image data exclusively, instead of such a time threshold.

Although the selection is performed periodically in the first example and is performed both at the obtainment of the new updated image data and at every predetermined interval T in the second example, the selection timing may be the timing when enough of a margin in bandwidth to transmit data is available. A combination of such examples may also be employed.

Moreover, although the time information stored in the transmission result storage 15 indicates only the timing obtaining latest updated image data in the examples above, the time information may include not only the latest timing but also one or more timings when updated image data is obtained.

The selection may be performed according to an update frequency which can be assumed by using a plurality of the time information.

Figure 12:
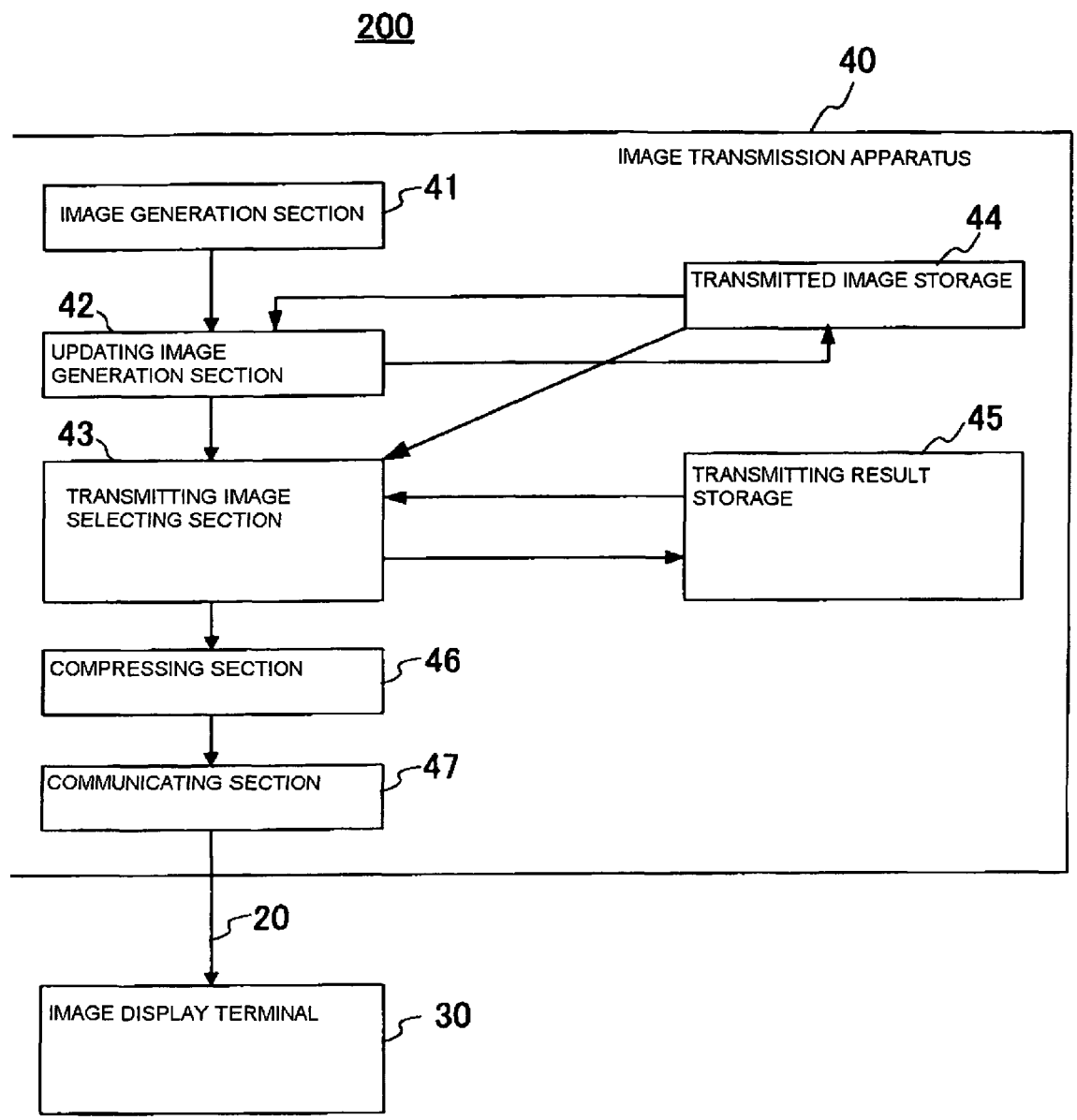
FIG. 12 is a diagram illustrating an image transmission system according to a second embodiment of the present invention.

FIG. 12 illustrates a diagram of an example of a second non-limiting embodiment of an image transmission system 200 at the present invention.

An image transmission system 200 includes an image transmission apparatus 40 and an image display terminal 30. The image display terminal 30 connects to a network 20. The image transmission apparatus 40 generates image data representing an image that should be displayed on a screen of the image display terminal 30. The image transmission apparatus 40 transmits the image data to the image display apparatus 30 through the network 20.

The image transmission apparatus 40 includes an image generation section 41, an updating image generation section 42, a transmitting image selecting section 43, a transmitted image storage 44, a transmitting result storage 45, a compressing section 46, and a communicating section 47.

The image generation section 41 generates image data to be displayed on the screen of the image display terminal 30.

The transmitted image storage 44 stores old image data which the image generation section 41 generated in the past.

The updating image generation section 42 obtains latest image data from the image generation section 41 and old image data from the transmitted image storage 44. The updating image generation section 42 compares the latest image data and the old image data, and generates updated image data that represents the difference of those images. The updated image data includes position information that indicates the position of an image represented by the updated image data in a full screen image. The updated image data is used for updating the image stored in the transmitted image storage 44.

The transmitted image storage 44 and a part of the updating image generation section 42 may be configured with two frame buffers. Sequential image frames are stored in these frame buffers alternately. The updating image generation section 42 obtains the latest image data from one of those frame buffers that stores the latest image data, and obtains the old image data from the other frame buffer that stores an image frame generated before the latest image data. The updating image generation section 42 compares image data stored in those two buffers, and generates an updated image data which is a subtraction of the latest image data from the old image data.

The updating image generation section 42 may generate the updated image data at a timing of getting the updated image data from the updating image generation section. The updating image generation section 42 may generate the updated image data at a timing of every predetermined interval. The updating image generation section 42 may generate the updated image data at a timing to be required from the transmitting image selecting section 43. Moreover, the updating image generation section 42 may store a plurality of the updated image data.

The updating image generation section 42 may generate the updated image data by reading out image data from a VRAM (Video Random Access Memory) of a PC, periodically. Sequential image frames stored in frame buffers may be obtained from a PC through a video signal interface.

The transmitting image selecting section 43 selects transmission image data for every predetermined period according to the updated image data and transmission result data. The transmission result data is stored in the transmission result storage 45.

The transmission image data is selected from among the updated image data and the image data stored in the image storage 44.

If the image data stored in the image storage 44 is selected as the transmission image data, the transmitting image selecting section 43 selects which region of the image represented by the image data shall be sent, and also selects quality of the transmission image data.

The transmission result storage 45 stores the transmission result data which includes quality information and time information. The transmission result data is stored for every unit of the transmission image data such as a pixel, a block of pixels, etc.

The compressing section 46 compresses the transmission image data according to a compression method selected by the transmitting image selecting section 43.

The communicating section 47 transmits the transmission image data compressed by the compressing section 46 to the image display terminal 30 through the network 20.

That is, the image transmission system 200 includes the transmitted image storage 44 instead of the image storage 14 of the first embodiment.

If the image transmission apparatus 40 is configured with a PC, functions of the image generation section 41, the updating image generation section 42, the transmitting image selecting section 43, the transmitted image storage 44, the transmitting result storage 45, the compressing section 46, and the communicating section 47 may be respectively realized by a computer program.

Obviously, numerous modifications and variations of the present invention are possible in light of the above teachings. It is therefore to be understood that within the scope of the appended claims, the invention may be practiced otherwise than as specifically described herein.

The invention claimed is:

1. An image transmission apparatus comprising:
   an image data generator configured to generate image data that represents an image;
   an updated image data generator configured to generate updated image data that represents an updated image of an updated region of the image;
   a compressor configured to compress the updated image data;
   a transmitter configured to transmit the updated image data compressed by the compressor;
   an updated image data storage configured to store the updated image data before the updated image data is compressed by the compressor;
   a transmission result storage configured to store transmission result data that includes quality information and time information, the quality information relating to an image quality, the time information indicating when the updated image data is generated; and
   a transmission data selector configured to select the updated image data stored in the updated image data storage, and to set the image quality of the updated image data selected, according to the transmission result data stored in the transmission result storage.

2. The image transmission apparatus of claim 1, wherein:
   the transmitter transmits the updated image data within a transmission bandwidth; and
   the transmission data selector selects the updated image data stored in the updated image data storage for transmitting if there is enough available transmission bandwidth.

3. The image transmission apparatus of claim 1, wherein:
   the transmitter transmits the updated image data within a transmission bandwidth; and
   the transmission data selector selects the updated image data stored in the updated image data storage for transmitting if there is enough available transmission bandwidth to transmit the updated image data.

4. The image transmission apparatus of claim 1, wherein:
   the transmitter transmits the updated image data within a transmission bandwidth;
   the transmission result storage stores transmission result data indicating the updated image data was compressed with a first compression quality; and
   the transmission data selector selects the updated image data stored in the updated image data storage for transmitting if there is enough available transmission bandwidth to transmit the updated image data compressed with a second compression quality having a compression ratio higher than of the first compression quality.

5. The image transmission apparatus of claim 1, wherein:
   the updated image data storage stores old updated image data transmitted by the transmitter at a past time;
   the transmission result storage stores transmission result data that includes quality information and time information, the quality information indicating a compression quality that the old updated image data was compressed with, the time information indicating when the updated image data was generated; and
   the transmission data selector selects the old updated image data for transmitting with the updated image data, and sets the image quality of the old updated image data selected, according to the transmission result data stored in the transmission result storage.

6. An image transmission apparatus comprising:
   image data generating means for generating image data that represents an image;
   updated image data generating means for generating updated image data that represents an updated image of an updated region of the image;
   compressing means for compressing the updated image data;
   transmitting means for transmitting the updated image data compressed by the compressing means;
   updated image data storing means for storing the updated image data before the updated image data is compressed by the compressing means;
   transmission result storing means for storing transmission result data that includes quality information and time information, the quality information relating to an image quality, the time information indicating when the updated image data is generated; and
   transmission data selecting means for selecting the updated image data stored in the updated image data storing means, and to set the image quality of the updated image data selected, according to the transmission result data stored in the transmission result storing means.

7. The image transmission apparatus of claim 6, wherein:
the transmitting means transmits the updated image data within a transmission bandwidth; and
the transmission data selecting means selects the updated image data stored in the updated image data storing means for transmitting if there is enough available transmission bandwidth.

8. The image transmission apparatus of claim 6, wherein:
the transmitting means transmits the updated image data within a transmission bandwidth; and
the transmission data selecting means selects the updated image data stored in the updated image data storing means for transmitting if there is enough available transmission bandwidth to transmit the updated image data.

9. The image transmission apparatus of claim 6, wherein:
the transmitting means transmits the updated image data within a transmission bandwidth;
the transmission result storing means stores transmission result data indicating the updated image data was compressed with a first compression quality; and
the transmission data selecting means selects the updated image data stored in the updated image data storing means for transmitting if there is enough available transmission bandwidth to transmit the updated image data compressed with a second compression quality having a compression ratio higher than of the first compression quality.

10. The image transmission apparatus of claim 6, wherein:
the updated image data storing means stores old updated image data transmitted by the transmitting means at a past time;
the transmission result storing means stores transmission result data that includes quality information and time information, the quality information indicating a compression quality that the old updated image data was compressed with, the time information indicating when the updated image data was generated; and
the transmission data selecting means selects the old updated image data for transmitting with the updated image data, and sets the image quality of the old updated image data selected, according to the transmission result data stored in the transmission result storing means.

11. An image transmission method comprising:
generating image data that represents an image;
generating updated image data that represents an updated image of an updated region of the image;
compressing the updated image data;
transmitting the compressed updated image data;
storing the updated image data before the compressing of the updated image data;
storing transmission result data that includes quality information and time information, the quality information relating to an image quality, the time information indicating when the updated image data is generated;
selecting the updated image data according to the transmission result data; and
setting the image quality of the updated image data which is selected, according to the transmission result data.

12. The image transmission method of claim 11, wherein:
the transmitting transmits the updated image data within a transmission bandwidth; and
the selecting selects the updated image data for transmitting if there is enough available transmission bandwidth.

13. The image transmission method of claim 11, wherein:
the transmitting transmits the updated image data within a transmission bandwidth; and
the selecting selects the updated image data for transmitting if there is enough available transmission bandwidth to transmit the updated image data.

14. The image transmission method of claim 11, wherein:
the transmitting transmits the updated image data within a transmission bandwidth;
the storing stores transmission result data indicating the updated image data was compressed with a first compression quality; and
the selecting selects the updated image data for transmitting if there is enough available transmission bandwidth to transmit the updated image data compressed with a second compression quality having a compression ratio higher than of the first compression quality.

15. The image transmission method of claim 11, wherein:
the storing stores old updated image data which is transmitted at a past time;
the storing stores transmission result data that includes quality information and time information, the quality information indicating a compression quality that the old updated image data was compressed with, the time information indicating when the updated image data was generated;
the selecting selects the old updated image data for transmitting with the updated image data; and
the setting sets the image quality of the old updated image data which is selected, according to the transmission result data.

16. A non-transitory computer-readable storage medium storing instructions, which when executed by a computer, cause the computer to perform steps comprising:
generating image data that represents an image;
generating updated image data that represents an updated image of an updated region of the image;
compressing the updated image data;
transmitting the compressed updated image data;
storing the updated image data before the compressing of the updated image data;
storing transmission result data that includes quality information and time information, the quality information relating to an image quality, the time information indicating when the updated image data is generated;
selecting the updated image data according to the transmission result data; and
setting the image quality of the updated image data which is selected, according to the transmission result data.

17. The non-transitory computer-readable storage medium of claim 16, wherein:
the transmitting transmits the updated image data within a transmission bandwidth; and
the selecting selects the updated image data for transmitting if there is enough available transmission bandwidth.

18. The non-transitory computer-readable storage medium of claim 16, wherein:
the transmitting transmits the updated image data within a transmission bandwidth; and
the selecting selects the updated image data for transmitting if there is enough available transmission bandwidth to transmit the updated image data.

19. The non-transitory computer-readable storage medium of claim 16, wherein:
the transmitting transmits the updated image data within a transmission bandwidth;

the storing stores transmission result data indicating the updated image data was compressed with a first compression quality; and the selecting selects the updated image data for transmitting if there is enough available transmission bandwidth to transmit the updated image data compressed with second compression quality having a compression ratio higher than of the first compression quality.

20. The non-transitory computer-readable storage medium of claim 16, wherein:

the storing stores old updated image data that is transmitted at a past time;

the storing stores transmission result data that includes quality information and time information, the quality information indicating a compression quality that the old updated image data was compressed with, the time information indicating when the updated image data was generated;

the selecting selects the old updated image data for transmitting with the updated image data; and the setting sets the image quality of the old updated image data which is selected, according to the transmission result data.

* * * * *